(12) United States Patent
Gindele et al.

(10) Patent No.: US 6,795,586 B1
(45) Date of Patent: Sep. 21, 2004

(54) NOISE CLEANING AND INTERPOLATING SPARSELY POPULATED COLOR DIGITAL IMAGE

(75) Inventors: Edward B. Gindele, Rochester, NY (US); James E. Adams, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/212,453

(22) Filed: Dec. 16, 1998

(51) Int. Cl.[7] ................................................ G03F 3/08
(52) U.S. Cl. ...................................... 382/260; 382/210
(58) Field of Search ............................... 382/260–269, 382/210; 358/463

(56) References Cited

U.S. PATENT DOCUMENTS

| | | | | |
|---|---|---|---|---|
| 5,189,511 A | * | 2/1993 | Parulski et al. | ................ 358/80 |
| 5,373,322 A | * | 12/1994 | Laroche et al. | ............. 348/273 |
| 6,042,545 A | * | 3/2000 | Hossack et al. | ............ 600/443 |
| 6,229,578 B1 | | 5/2001 | Acharya et al. | ............ 348/607 |

* cited by examiner

*Primary Examiner*—Thomas D. Lee
*Assistant Examiner*—Stephen Brinich
(74) *Attorney, Agent, or Firm*—Raymond L. Owens

(57) ABSTRACT

A method for processing a sparsely populated color digital image having colored pixels to produce a fully populated and noise clean color image including noise cleaning the sparsely populated image to provide a noise clean sparsely populated color digital image; and interpolating the noise clean sparsely populated image for producing color pixels with appropriate values missing from the sparsely populated color digital image by interpolating the color values for missing pixels from neighboring color pixels.

12 Claims, 4 Drawing Sheets

```
R G R G R              R1              R1  G2  R3
G B G B G              G2              G4  B5  G6
R G R G R    R3 G4 R5 G6 R7            R7  G8  R9
G B G B G              G8
R G R G R              R9

```

NOISE CLEANING AND INTERPOLATING SPARSELY POPULATED COLOR DIGITAL IMAGE

FIELD OF THE INVENTION

The present invention relates to noise cleaning and interpolating sparsely populated color digital image.

BACKGROUND OF THE INVENTION

In electronic photography, it is desirable to simultaneously capture image data in three color planes, usually red, green and blue. When the three color planes are combined, it is possible to create high-quality color images. Capturing these three sets of image data can be done in a number of ways. In electronic photography, this is sometimes accomplished by using a single two dimensional array of photosites that are covered by a pattern of red, green, and blue, filters. This type of sensor is known as a color filter array or CFA. Below is shown the red (R), green (G), and blue (B) pixels arranged in rows and columns on a conventional color filter array sensor.

R G R G R
G B G B G
R G R G R
G G B G B G
R G R G R

Digital images produced by these and other types of devices, such as linear scanners which scan photographic images, often produce a sparsely populated color digital image. Such an image has a problem in that it has a noise component due to random variations in the image capturing system such as thermal variations in the color filter array sensor, or with the associated electronic circuitry or the like. Also, when an image is being interpolated to produce a fully populated color digital image, artifacts can be introduced. It is, of course, highly desirable to remove these noise components.

FIG. 1 depicts a prior art arrangement wherein a fully populated digital color image in block 10 is first noise cleaned in block 12 to provide a fully populated noise cleaned image 14. Examples of arrangements which provide these functions are set forth in: U.S. Pat. No. 5,671,264 to Florent, et al., U.S. Pat. No. 5,768,440 to Campanelli, et al., and U.S. Pat. No. 5,802,481 to Prieto. See also J-S. Lee, "Digital Image Smoothing and the Sigma Filter," *Computer Vision, Graphics*, and *Image Processing*, 24, 1983, 255–269; G. A. Mastin, "Adaptive Filters for Digital Image Noise Smoothing: An Evaluation," *Computer Vision, Graphics*, and *Image Processing*, 31, 1, Jul. 1985, 103–121; and W. K. Pratt, "Noise Cleaning" in *Digital Image Processing, Second Edition*, John Wiley & Sons, Inc., New York, 1991, 285–302. This arrangement has problems. In order to begin with a fully populated digital color image, a number of image processing operations have already taken place on the original sparsely populated image data. Each operation that is performed on the sparsely populated image data to create a fully populated digital color image will amplify the noise imbedded in the original sparsely populated image data. Additionally, the ability to separate noise from genuine image information may be compromised by certain image processing operations that rely on and impose certain amounts of spatial correlation between the color planes of an image. Color filter array interpolation is an example of this kind of image processing operation. As a result, the relationship between noise and genuine image data is raised in complexity and, accordingly, more complex noise cleaning algorithms are required. Finally, since the original sparsely populated image data is noisy, the image processing operations that are performed on this data will produce suboptimal results due to the noise.

FIG. 2 shows another prior art arrangement wherein a sparsely populated color digital image is simultaneously interpolated and noise cleaned in block 18 to provide a fully populated color digital image 20. Examples of arrangements which provide these functions are set forth in: U.S. Pat. No. 5,382,976 to Hibbard, U.S. Pat. No. 5,596,367 to Hamilton, et al., and U.S. Pat. No. 5,652,621 to Adams, et al. This arrangement also has problems. While the noise cleaning is occurring before a fully populated color digital image is produced, a number of image processing operations are still being performed on noisy data. For example, if the CFA interpolation employed is an adaptive algorithm, the decisions the algorithm makes during the course of the interpolation process can be significantly influenced by the noise embedded in the image data. As a result, wrong decisions can be made which produce pixel artifacts and unnecessary amplification of the noise in the image data.

SUMMARY OF THE INVENTION

It is an object of the present invention to provide a more effective way of interpolating and noise cleaning sparsely populated color digital image to provide fully populated noise cleaned color digital images.

These objects are achieved by a method for processing a sparsely populated color digital image having colored pixels to produce a fully populated and noise clean color image comprising the steps of:

a) noise cleaning the sparsely populated image to provide a noise clean sparsely populated color digital image; and b) interpolating the noise clean sparsely populated image for producing color pixels with appropriate values missing from the sparsely populated color digital image by interpolating the color values for missing pixels from neighboring color pixels.

ADVANTAGES

The advantages of this invention are 1) avoidance of noise amplification and pixel artifact generation in subsequent image processing operations, 2) the permitting of the use of simpler noise cleaning algorithms which are computationally more efficient, and 3) maximization of performance of subsequent image processing operations due to the reduction of noise in the image data.

DETAILED DESCRIPTION OF THE INVENTION

Figure 1:
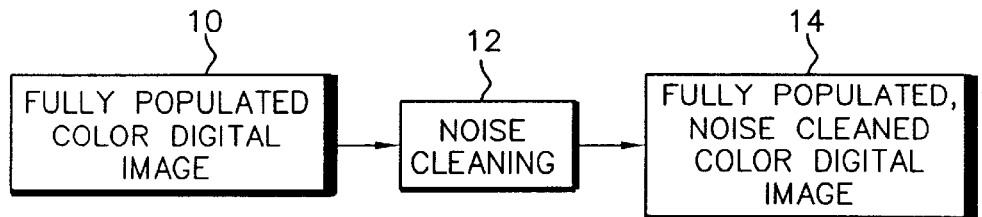
FIG. 1 is a block diagram of a prior art processing arrangement for producing fully populated noise clean color digital images.
Figure 2:
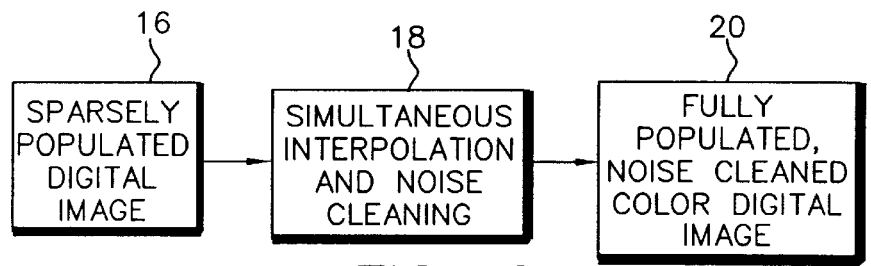
FIG. 2 is another block diagram of a prior art processing arrangement for producing fully populated noise clean color digital images.
Figure 3:
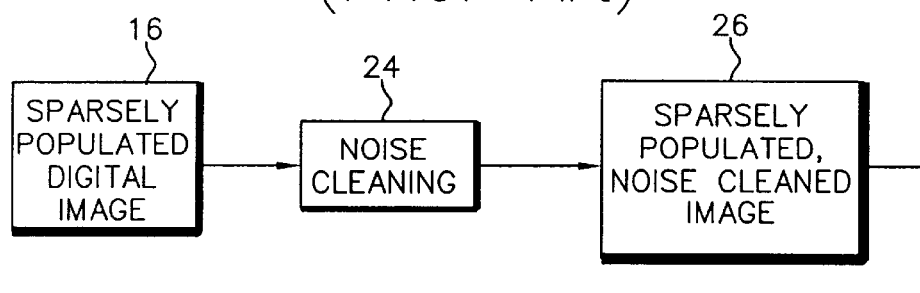
FIG. 3 is a block diagram of a noise cleaning and interpolation arrangement in accordance with the present invention.
Figure 3:
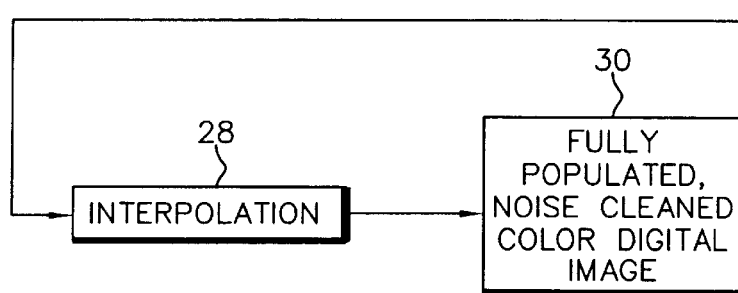

Referring to FIG. 3, the process of producing a noise cleaned image begins in block 16 with a sparsely populated digital image. This image is missing pixel values at various spatial locations, in various color planes, or both. Noise cleaning is then performed in block 24 on the image that removes, or cleans, the noise from the existing image data. This noise cleaning is designed to operate using only the existing image data. The result is a sparsely populated, noise cleaned image (block 26). At this point interpolation is performed in block 28 to produce estimates for each of the missing pixel values in the image. The result of the interpolation is a fully populated, noise cleaned color digital image (see block 30.)

Figure 4A:
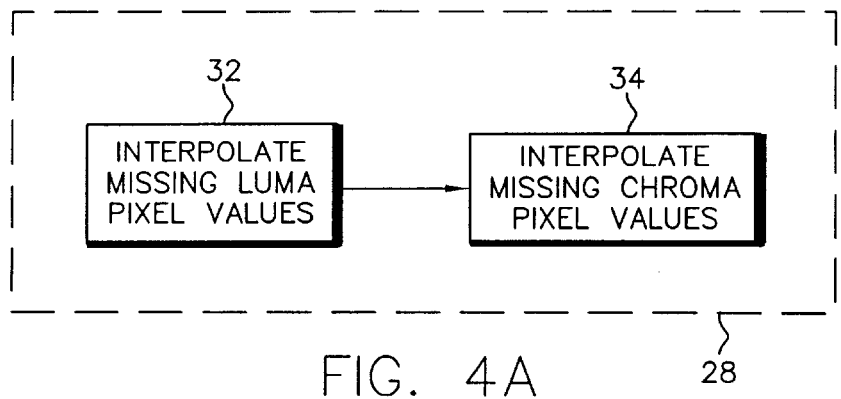
FIG. 4A–B are flow charts of a preferred embodiment of the interpolation depicted in FIG. 3.
Figure 4B:
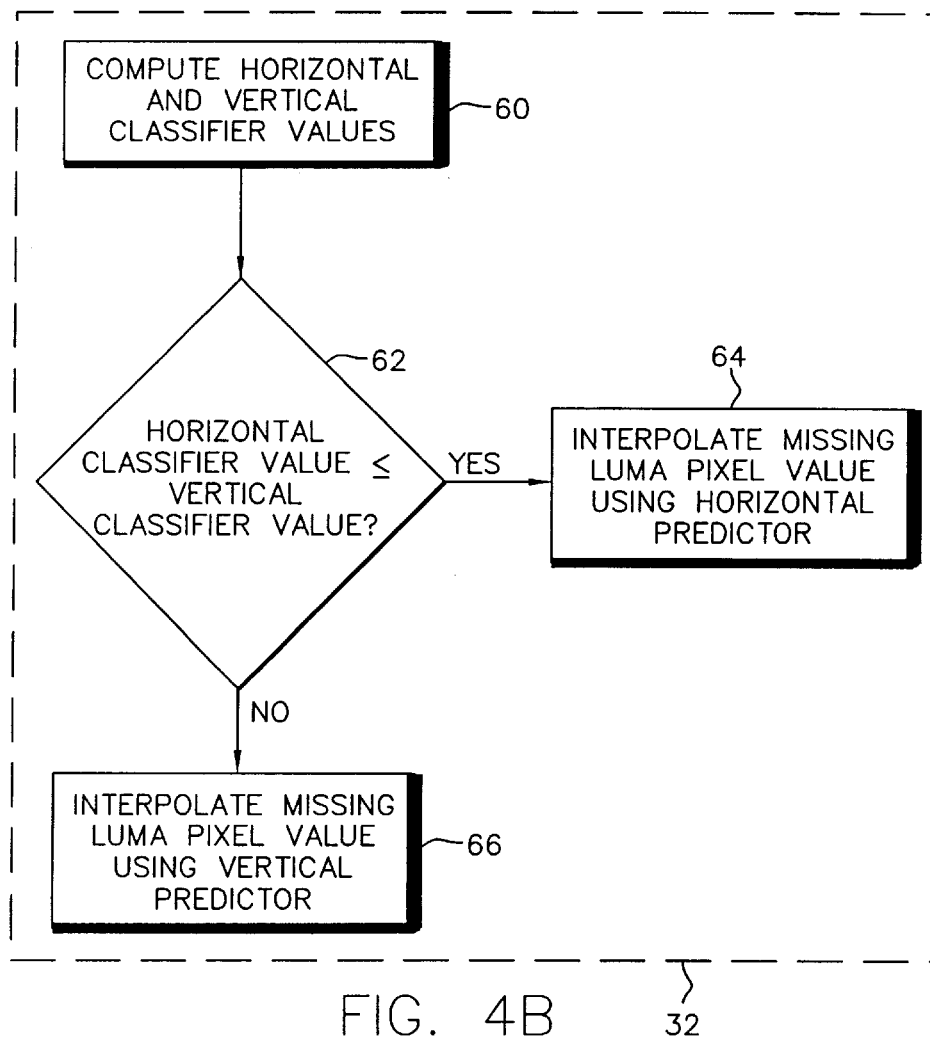
Figures 4C, 4D, 4E, 5A, 5B, 5C, 6:
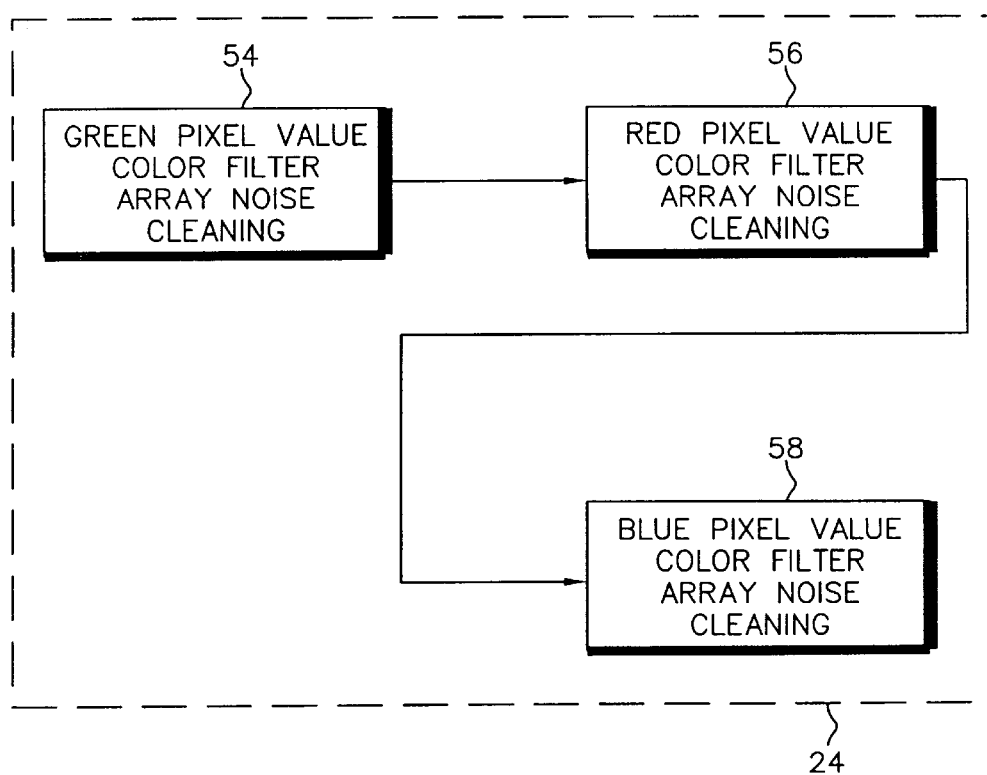
FIG. 4C–E show various pixel neighborhoods of a preferred embodiment of the interpolation depicted in FIG. 3.
FIG. 5A–C show 5×5 kernels or matrices for respectively noise cleaning red, green, and blue color pixels of the FIG. 3 arrangement.
FIG. 6 is a more detailed block diagram of block 24 of FIG. 3.

FIG. 4C is an example of a sparsely populated digital image. This figure shows a portion of a color filter array commonly used in digital cameras. Each pixel in the camera sensor is covered with either a red, green, or blue filter. As a result, at each pixel location in the image captured by the digital camera only one of three color pixel values are produced. FIG. 6 shows a strategy for noise cleaning this type of image. The main strategy is to clean each color plane in the sparsely populated image separately. In block 54 of FIG. 6, the first color plane cleaned is the green plane. FIG. 5A shows a portion of the color filter array image with a green pixel in the center of a 5×5 kernel. Each green pixel value within that kernel is surrounded with a square. From FIG. 5A is can be seen that a maximum of 13 green pixel values are available within this kernel for producing a noise cleaned value for the central green pixel. The noise cleaning operation (block 54) must be designed to use, at most, only these 13 green pixel values. Once the green pixels values in the color filter array image have been cleaned, then the red pixel values are cleaned (see block 56.) FIG. 5B shows a portion of the color filter array image with a red pixel in the center of a 5×5 kernel. Each red pixel value within that kernel is surrounded with a square. From FIG. 5B is can be seen that a maximum of 9 red pixel values are available within this kernel for producing a noise cleaned value for the central red pixel. In block 56, the noise cleaning operation must be designed to use, at most, only these 9 red pixel values. Finally, in block 58, the blue pixel values are cleaned. FIG. 5C shows a portion of the color filter array image with a blue pixel in the center of a 5×5 kernel. Each blue pixel value within that kernel is surrounded with a square. From FIG. 5C is can be seen that a maximum of 9 blue pixel values are available within this kernel for producing a noise cleaned value for the central blue pixel. The noise cleaning operation of block 58 must be designed to use, at most, only these 9 blue pixel values.

Figure 7:
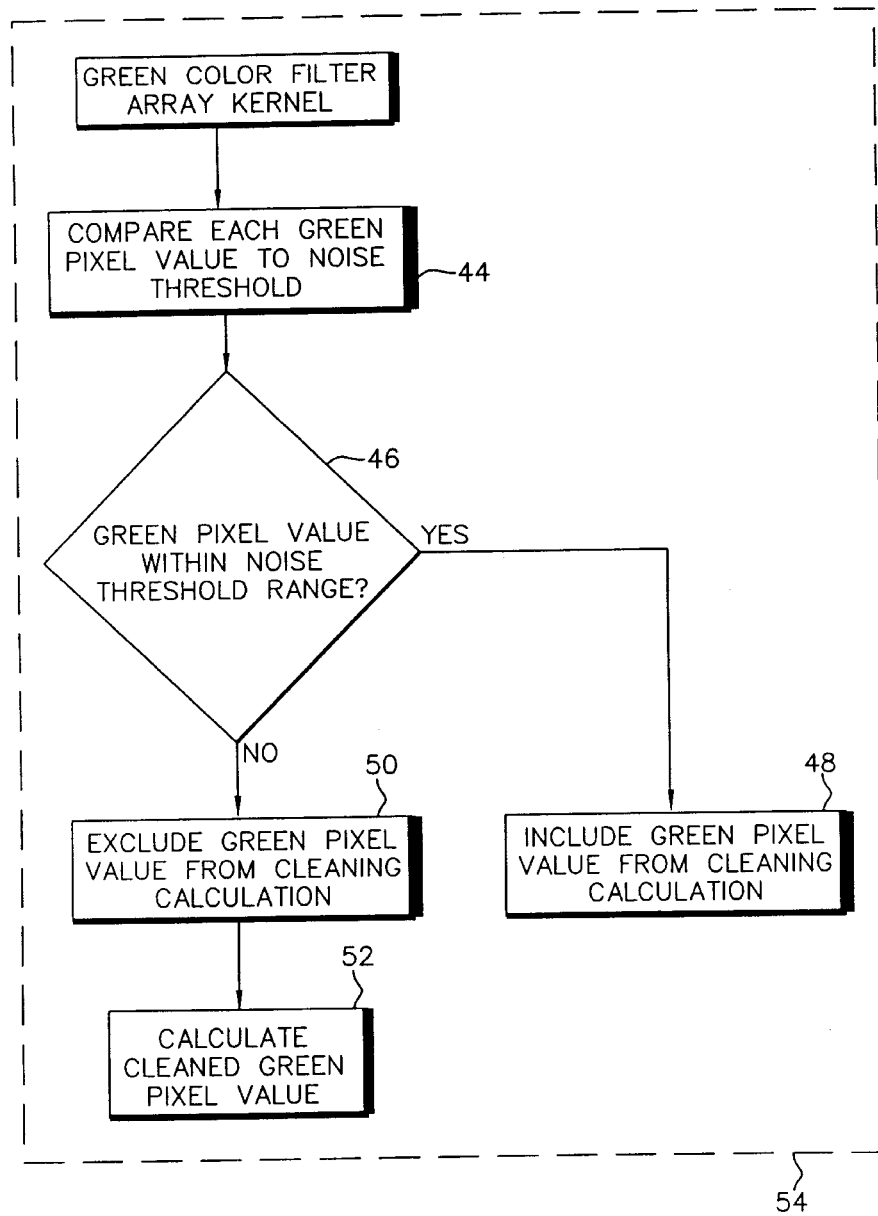
FIG. 7 is a flow chart of block 54 shown in FIG. 6.

FIG. 7 describes how noise cleaning can be performed on the color filter array sampled green pixel values of block 54. In block 42, the noise cleaning begins by selecting a green color filter array kernel to be cleaned. This kernel has already been illustrated in FIG. 5A. Each green pixel value within FIG. 5A is compared with a predetermined noise threshold value in block 44. This noise threshold value characterizes the typical amount of noise the image capture device is expected to produce. Commonly, it is assumed that the noise in an image is Gaussian distributed. Using this assumption, one evaluates the standard deviation of the noise for a number of typical mean pixel values and sets the noise threshold value equal to 2 times the standard deviation. Returning to block 44, the comparison of the green pixel value with the noise threshold value (block 44), the absolute difference between each green pixel value in the kernel and the green pixel value in the center of the kernel is compared with the noise threshold value. If, in block 46, this green pixel value difference is less than or equal to the noise threshold value, then the green pixel value is include in the subsequent noise cleaning calculation shown in block 48. If the green pixel value difference exceeds the noise threshold, then the green pixel value is not used in the subsequent noise cleaning calculation in block 50. Once each green pixel value is tested in the kernel, then a noise cleaned value for the central green pixel value is calculated in block 52. This calculation is a simple average of all of the green pixel values that satisfied the noise threshold value comparison accomplished in block 48.

It should be noted that the noise cleaned value needs to be stored separately from the raw image data until the entire color plane has been noise cleaned. All noise cleaning operations in FIG. 6 are performed on image data that has not been previously noise cleaned. Noise cleaning of the red pixel values in block 56 and the blue pixel values in block 58 are performed in the same manner as noise cleaning of the green pixel values in block 54. The only changes would be different values for the noise thresholds and different locations of the pixel values processed (see FIGS. 5B and 5C.)

Once the color filter array data has been noise cleaned in block 26, the image data is interpolated to produce a fully populated image in block 30. FIG. 4A shows that interpolation is performed in two stages. The first stage interpolates missing green, or luma, pixel values is provided in block 32 and the second stage interpolates missing red and blue, or chroma, pixel values is provided in block 34. FIG. 4B is a more detailed diagram of the luma interpolation process. Luma interpolation begins by selecting an appropriate pixel neighborhood around the missing luma pixel value in question. In FIG. 4D, the missing luma value G5 is being determined. The first step is to calculate horizontal and vertical classifier values for the neighborhood in block 60. The horizontal classifier value, h, for FIG. 4D can be $$h=ABS(G4-G6)+ABS(2R5-R3-R7)$$

where ABS(X) is the absolute value of X. The vertical classifier value, v, for FIG. 4D can be $$v=ABS(G2-G8)+ABS(2R5-R1-R9).$$

These classifier values are then compared to each other in block 62. If the horizontal classifier value is less than or equal to the vertical classifier value, then the missing luma pixel value is set equal to the horizontal predictor value, H, for the neighborhood (see block 64). The horizontal predictor value for FIG. 4D can be $$H=(G4+G6)/2+K(2R5-R3-R7)$$

where K is an adjustable value that controls the fidelity of the reconstructed luma color plane. Typical values for K are ¼, 3/16 and ⅛. If the horizontal classifier value is greater than the vertical classifier value, then the missing luma pixel value is set equal to the vertical predictor value, V, for the neighborhood (see block 66). The vertical predictor value for FIG. 4D can be $$V=(G2+G8)/2+K(2R5-R1-R9)$$

where the same value of K would be used for both the horizontal predictor value and the vertical predictor value.

The second stage of the interpolation process provided in block 34 is chroma interpolation. Chroma interpolation refers to both red and blue pixel value interpolation. Either color plane may be interpolated first. FIG. 4E shows an appropriate pixel neighborhood for performing red interpolation. It is assumed that luma interpolation has been completed, so the green pixel values G1, G3, G5, G7 and G9 are available. The red pixel values R2 and R8 are calculated using the following horizontal predictors:

$$R2=(R1+R3)/2+(2G2-G1-G3)/2 \text{ and}$$

$$R8=(R7+R9)/2+(2G8-G7-G9)/2.$$

The red pixel values R4 and R6 are calculated using the following vertical predictors:

$$R4=(R1+R7)/2+(2G4-G1-G7)/2 \text{ and}$$

$$R6=(R3+R9)/2+(2G6-G3-G9)/2.$$

The red pixel value R5 is calculated using the following four-corner predictor:

$$R5=(R1+R3+R7+R9)/4+(4G5-G1-G3-G7-G9)/4.$$

All missing red pixel values in the image can be calculated in this manner. Missing blue pixel values may also be calculated from these predictors. The only changes required to FIG. 4E and the preceding predictors is to exchange every occurrence of "R" with "B."

The invention has been described in detail with particular reference to certain preferred embodiments thereof, but it will be understood that variations and modifications can be effected within the spirit and scope of the invention.

PARTS LIST 10 fully populated color digital image
12 noise cleaning block
14 fully populated, noise cleaned color digital image
16 sparsely populated digital image
18 simultaneous interpolation and noise cleaning block
20 fully populated, noise cleaned color digital image
24 noise cleaning block
26 sparsely populated, noise cleaned image
28 interpolation block
30 fully populated, noise cleaned color digital image
32 luma interpolation block
34 chroma interpolation block
42 green color filter array kernel
44 noise threshold comparison block
46 green pixel value comparison block
48 green pixel value inclusion block
50 green pixel value exclusion block
52 cleaned green pixel value calculation block
54 green pixel value noise cleaning block
56 red pixel value noise cleaning block
58 blue pixel value noise cleaning block
60 classifier value computation block
62 classifier value comparison block
64 luma horizontal prediction block
66 luma vertical prediction block

What is claimed is:

1. A method for processing a sparsely populated color digital image having colored pixels to produce a fully populated and noise clean color image, comprising:

a) noise cleaning the colored pixels in the sparsely populated color digital image by providing a noise cleaning kernel for each color in the sparsely populated image and calculating noise cleaned pixel values by averaging selected kernel pixel values including the pixel value to be cleaned to produce a noise clean sparsely populated color digital image where kernel pixel values are selected in accordance with a fixed value threshold used for all pixels of the sparsely populated color digital image corresponding to the color; and b) interpolating the noise clean sparsely populated image for producing color pixels with appropriate values missing from the sparsely populated color digital image by interpolating the color values for missing pixels from neighboring color pixels.

2. The method of claim 1 wherein there are red, green, and blue pixels and the kernel pixels for a red center pixel are the red (R) pixels:

R G R G R
G B G B G
R G R G R
G B G B G
R G R G R.

3. The method of claim 1 wherein there are red, green, and blue pixels and the kernel pixels for a green center pixel are the green (G) pixels:

G R G R G
B G B G B
G R G R G
B G B G B
G R G R G.

4. The method of claim 1 wherein there are red, green, and blue pixels and the kernel pixels for a blue center pixel are the blue (B) pixels:

B G B G B
G R G R G
B G B G B
G R G R G
B G B G B.

5. A method for processing a sparsely populated color digital image provided by a color filter array of a scanner or digital camera having colored pixels to produce a fully populated and noise clean color image, comprising:

a) noise cleaning the colored pixels in the sparsely populated color digital image by providing a noise cleaning kernel for each color in the sparsely populated image and calculating noise cleaned pixel values by averaging selected kernel pixel values including the pixel value to be cleaned wherein the non-center kernel pixels are selected in accordance with a threshold corresponding to an expected magnitude of noise produced by the scanner or digital camera; and b) interpolating the noise clean sparsely populated image for producing color pixels with appropriate values missing from the sparsely populated color digital image by interpolating the color values for missing pixels from neighboring color pixels.

6. A method for processing a sparsely populated color digital image having colored pixels to produce a fully populated and noise clean color image, comprising:

a) noise cleaning the colored pixels in the sparsely populated color digital image by providing a noise cleaning kernel for each color in the sparsely populated image and calculating noise cleaned pixel values by using a same filter and a same filter operation to clean all the pixels, the filter including averaging selected kernel pixel values including the pixel value to be cleaned to produce a noise clean sparsely populated color digital image; and b) interpolating the noise clean sparsely populated image for producing color pixels with appropriate values missing from the sparsely populated color digital image by interpolating the color values for missing pixels from neighboring color pixels.

7. A method for processing a sparsely populated color digital image provided by a color filter array of an image capture device having colored pixels to produce a fully populated and noise clean color image, comprising:

a) noise cleaning the colored pixels in the sparsely populated color digital image by providing a noise cleaning kernel for each color in the sparsely populated image and calculating noise cleaned pixel values by averaging selected kernel pixel values wherein the kernel pixels are selected in accordance with a threshold value that corresponds to the expected magnitude of noise produced by the image capture device; and b) interpolating the noise clean sparsely populated image for producing color pixels with appropriate values missing from the sparsely populated color digital image by interpolating the color values for missing pixels from neighboring color pixels.

8. A method for processing a sparsely populated color digital image provided by a color filter array of an image capture device having colored pixels to produce a fully populated and noise clean color image, comprising:

a) noise cleaning the colored pixels in the sparsely populated color digital image by providing a noise cleaning kernel for each color in the sparsely populated image and calculating noise cleaned pixel values using a weighted average of kernel pixel values wherein the weight of each kernel pixel is determined by:

i) calculating a difference value for the kernel pixel as the absolute value of the difference between the value of the pixel to be cleaned and the value of the respective kernel pixel; and ii) comparing the difference value to a threshold value that corresponds to the expected magnitude of noise produced by the image capture device; and b) interpolating the noise clean sparsely populated image for producing color pixels with appropriate values missing from the sparsely populated color digital image by interpolating the color values for missing pixels from neighboring color pixels.

9. A method for processing a sparsely populated color digital image provided by a color filter array of having colored pixels to produce a fully populated and noise clean color image, comprising:

a) noise cleaning the colored pixels in the sparsely populated color digital image by providing a noise cleaning kernel for each color in the sparsely populated image and calculating noise cleaned pixel values by:

i) calculating a difference value for each kernel pixel as the difference between the value of the pixel to be cleaned and the respective kernel pixel value where kernel pixel values are selected in accordance with a fixed value threshold used for all pixels of the sparsely populated color digital image corresponding to the color; and ii) using the difference values to calculate the noise cleaned pixel to form a noise clean sparsely populated color digital image; and b) interpolating the noise clean sparsely populated image for producing color pixels with appropriate values missing from the sparsely populated color digital image by interpolating the color values for missing pixels from neighboring color pixels.

10. A method for processing a sparsely populated color digital image having colored pixels to produce a fully populated and noise clean color image, comprising:

a) noise cleaning the colored pixels in the sparsely populated color digital image by:

i) providing a noise cleaning kernel for each color of pixels in the sparsely populated image;

ii) selecting a pixel of interest from the sparsely populated color digital image and the corresponding noise cleaning kernel relating to the color of the pixel of interest;

iii) calculating a difference value for each kernel pixel in the noise cleaning kernel as the absolute value of the difference between the value of the pixel of interest and the respective kernel pixel value;

iv) calculating a noise cleaned pixel value by selectively averaging only kernel pixel values that have a corresponding difference value that is less than a predetermined threshold value used for all pixels of the sparsely populated color digital image corresponding to the color; and v) repeating steps ii) through iv) for other pixels in the sparsely populated color digital image forming a noise clean sparsely populated image; and b) interpolating the noise clean sparsely populated image for producing color pixels with appropriate values missing from the sparsely populated color digital image by interpolating the color values for missing pixels from neighboring color pixels.

11. A method for processing a sparsely populated color digital image produced by an image capture device having colored pixels to produce a fully populated and noise clean color image, comprising:

a) noise cleaning the colored pixels in the sparsely populated color digital image by:

i) providing a noise cleaning kernel for each color of pixels in the sparsely populated image;

ii) selecting a pixel of interest from the sparsely populated color digital image and the corresponding noise cleaning kernel relating to the color of the pixel of interest;

iii) calculating a difference value for each kernel pixel in the noise cleaning kernel as the absolute value of the difference between the value of the pixel of interest and the respective kernel pixel value;

iv) calculating a noise cleaned pixel value by selectively averaging only kernel pixel values that have a corresponding difference value that is less than a predetermined threshold value that corresponds to the expected magnitude of noise produced by the image capture device; and v) repeating steps ii) through iv) for other pixels in the sparsely populated color digital image forming a noise clean sparsely populated image; and b) interpolating the noise clean sparsely populated image for producing color pixels with appropriate values missing from the sparsely populated color digital image by interpolating the color values for missing pixels from neighboring color pixels.

12. A method for processing a sparsely populated color digital image having colored pixels to produce a fully populated and noise clean color image, comprising:

a) noise cleaning the colored pixels in the sparsely populated color digital image by providing a noise cleaning kernel for each color in the sparsely populated image and calculating noise cleaned pixel values by using a same filter and a same filter operation to clean all the pixels; and b) interpolating the noise clean sparsely populated image for producing color pixels with appropriate values missing from the sparsely populated color digital image by interpolating the color values for missing pixels from neighboring color pixels.

* * * * *